United States Patent
Muneta et al.

(10) Patent No.: US 11,061,377 B2
(45) Date of Patent: Jul. 13, 2021

(54) CONTROL DEVICE

(71) Applicant: OMRON Corporation, Kyoto (JP)

(72) Inventors: Yasuo Muneta, Kusatsu (JP); Koji Yaoita, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/478,140

(22) PCT Filed: Jan. 22, 2018

(86) PCT No.: PCT/JP2018/001780
§ 371 (c)(1),
(2) Date: Jul. 16, 2019

(87) PCT Pub. No.: WO2018/147058
PCT Pub. Date: Aug. 16, 2018

(65) Prior Publication Data
US 2019/0369587 A1 Dec. 5, 2019

(30) Foreign Application Priority Data

Feb. 13, 2017 (JP) .............................. JP2017-024282

(51) Int. Cl.
*G06F 9/46* (2006.01)
*G05B 19/05* (2006.01)

(52) U.S. Cl.
CPC .... *G05B 19/056* (2013.01); *G05B 2219/1101* (2013.01); *G05B 2219/13004* (2013.01); *G05B 2219/2205* (2013.01)

(58) Field of Classification Search
CPC .......... G05B 19/056; G05B 2219/1101; G05B 2219/13004; G05B 2219/2205
See application file for complete search history.

(56) References Cited

U.S. PATENT DOCUMENTS

| 9,715,226 | B2 * | 7/2017 | Kobayashi | ............. G05B 19/19 |
| 2014/0075139 | A1 * | 3/2014 | Reed | ..................... G06F 9/5011 711/162 |
| 2014/0200706 | A1 | 7/2014 | Pruschek et al. | |
| 2014/0316578 | A1 * | 10/2014 | Grosch | ............. G05B 19/0421 700/275 |
| 2016/0091882 | A1 * | 3/2016 | Ludwig | ................ G05B 19/056 700/86 |

FOREIGN PATENT DOCUMENTS

| JP | H04155405 | 5/1992 |
| JP | H04160408 | 6/1992 |

(Continued)

OTHER PUBLICATIONS

Nel, Use Windows System Resource Manager to control a server's powers, Tech Republic, Apr. 1, 2004, 15 pages.*

(Continued)

*Primary Examiner* — Diem K Cao
(74) *Attorney, Agent, or Firm* — JCIPRNET

(57) ABSTRACT

The invention realizes miniaturization, high performance, and informatization of a control device. Only an application not required to be repeatedly executed with respect to a control subject at an execution interval less than or equal to a prescribed time interval is assigned to a fourth core (114) of a PLC (10).

4 Claims, 4 Drawing Sheets

(56) References Cited

FOREIGN PATENT DOCUMENTS

| | | |
|---|---|---|
| JP | 2013506911 | 2/2013 |
| JP | 2016012221 | 1/2016 |
| JP | 2016024605 | 2/2016 |

OTHER PUBLICATIONS

Microsoft, Windows System Resource Manager Overview, Microsoft Doc, Aug. 31, 2016, 6 pages.*
"International Preliminary Report on Patentability (Form PCT/IPEA/409) of PCT/JP2018/001780," dated Aug. 17, 2018, with English translation thereof, pp. 1-6.
"International Search Report (Form PCT/ISA/210) of PCT/JP2018/001780," dated Apr. 10, 2018, with English translation thereof, pp. 1-4.
"Written Opinion of the International Searching Authority (Form PCT/ISA/237) of PCT/JP2018/001780," dated Apr. 10, 2018, with English translation thereof, pp. 1-10.
"Search Report of Europe Counterpart Application", dated Nov. 13, 2020, p. 1-p. 9.
"Office Action of Japan Counterpart Application", dated Sep. 8, 2020, with English translation thereof, p. 1-p. 6.

* cited by examiner

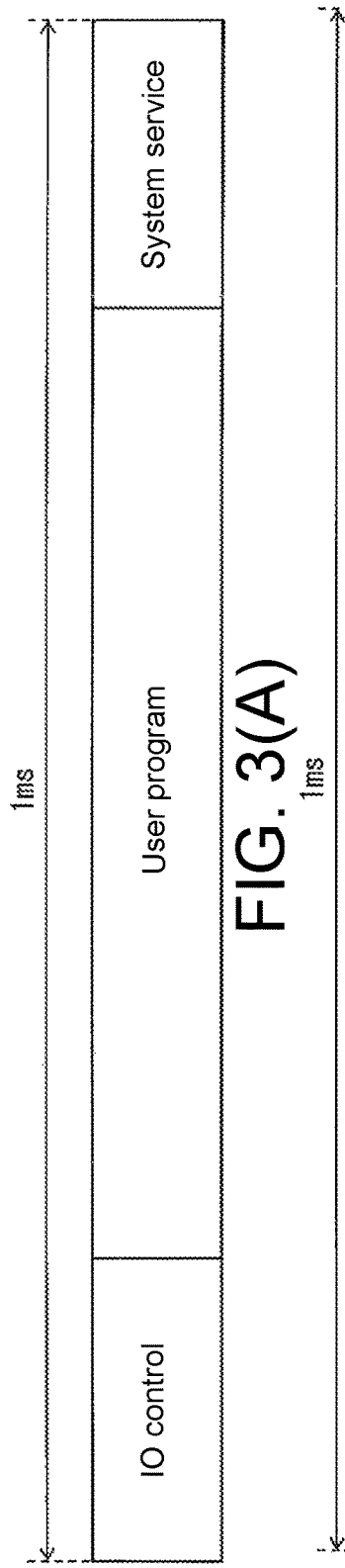
FIG. 3(A)
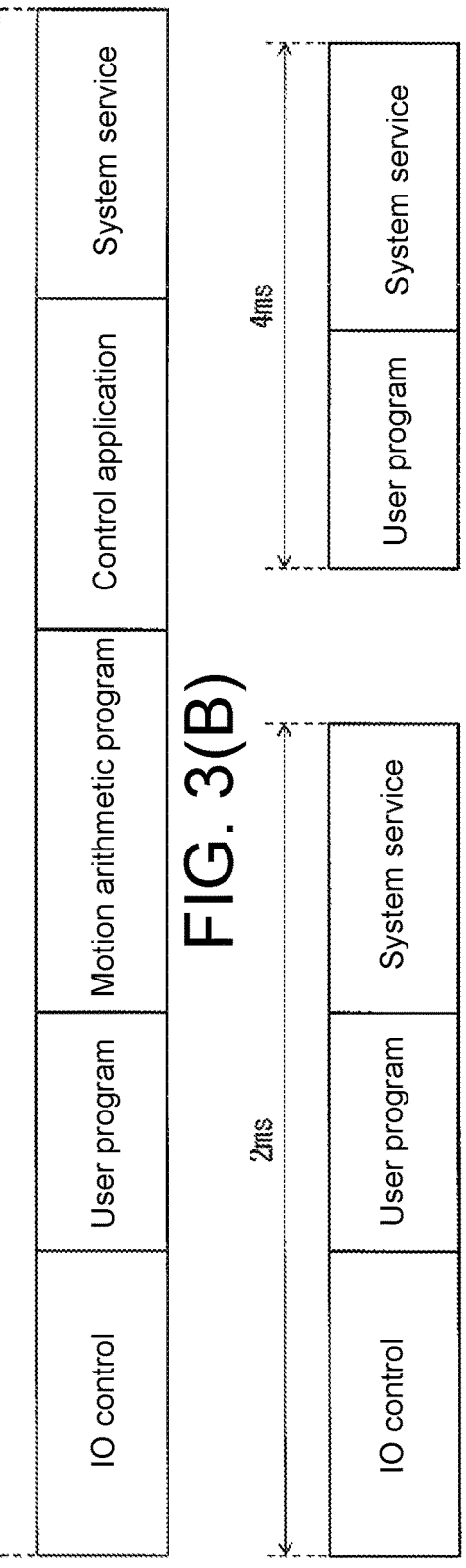
FIG. 3(B)
FIG. 3(C)
FIG. 3(D)
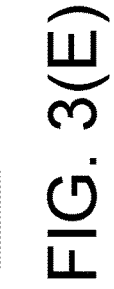
FIG. 3(E)

CONTROL DEVICE

CROSS-REFERENCE TO RELATED APPLICATION

This application is a 371 application of the international PCT application serial no. PCT/JP2018/001780, filed on Jan. 22, 2018, which claims the priority benefit of Japan application no. 2017-024282, filed on Feb. 13, 2017. The entirety of each of the abovementioned patent applications is hereby incorporated by reference herein and made a part of this specification.

BACKGROUND

Technical Field

The invention relates to a control device for controlling an operation of a machine, an apparatus, etc.

Description of Related Art

Conventionally, with respect to industrial control devices such as programmable logic controllers (hereinafter abbreviated as "PLC"), various attempts are known to both achieve informatization (that is, using information obtained and generated by the industrial control device in an external device, etc.) and facilitate the performance.

For example, Patent Document 1 listed below discloses a PLC which assigns each of a plurality of PLC functions executed periodically for high speed and high precision control on a control subject to each of a plurality of processors and executes at least two of the PLC functions in parallel.

RELATED ART DOCUMENT

Patent Document

Patent Document 1: Japanese Laid-open No. 2013-506911 (published on Feb. 28, 2013)

SUMMARY

Problems to be Solved

However, in the conventional art as described above, with respect to the high speed and high precision control process on the control subject, an issue such as that the influence resulting from a process that does not require a high speed and high precision and a non-periodic process, like a process for informatization, cannot be suppressed, may arise.

That is, the current PLC is required to execute the process that does not require a high speed and high precision and the non-periodic process, such as storing, analyzing, displaying information like "turn-on time", "number of operations", etc., of a device, in addition to executing the high speed and high precision control process on the control subject. Therefore, with respect to the current PLC required to execute the various processes described above, high performance and informatization cannot be realized simply by streamlining the execution of the high speed, high precision, and periodic process.

An aspect of the invention aims at rendering miniaturization as well as high performance with respect to a control device capable of executing a high speed and periodical process and a non-periodic process such as a process for informatization.

Means for Solving the Problems

To solve the above issue, a control device according to an aspect of the invention, which controls a control subject by repeatedly executing a plurality of control programs at a prescribed time interval, includes a multi-core processor and a memory storing the control programs. The multi-core processor includes an application core as a core to which only an application that is an application and that is not required to be repeatedly executed with respect to the control subject at an execution interval less than or equal to a prescribed time interval is assigned.

Effect of Invention

According to an aspect of the invention, the effect of being capable of rendering miniaturization as well as high performance with respect to a control device capable of executing a high speed and periodical process and a non-periodic process, such as a process for informatization, is achieved.

BRIEF DESCRIPTION OF THE DRAWINGS

FIG. 3(A) to FIG. 3(E) are diagrams is a diagram showing examples of tasks to be executed by the control device according to Embodiment 1 of the invention.

DESCRIPTION OF THE EMBODIMENTS

Embodiment 1

Figure 1:
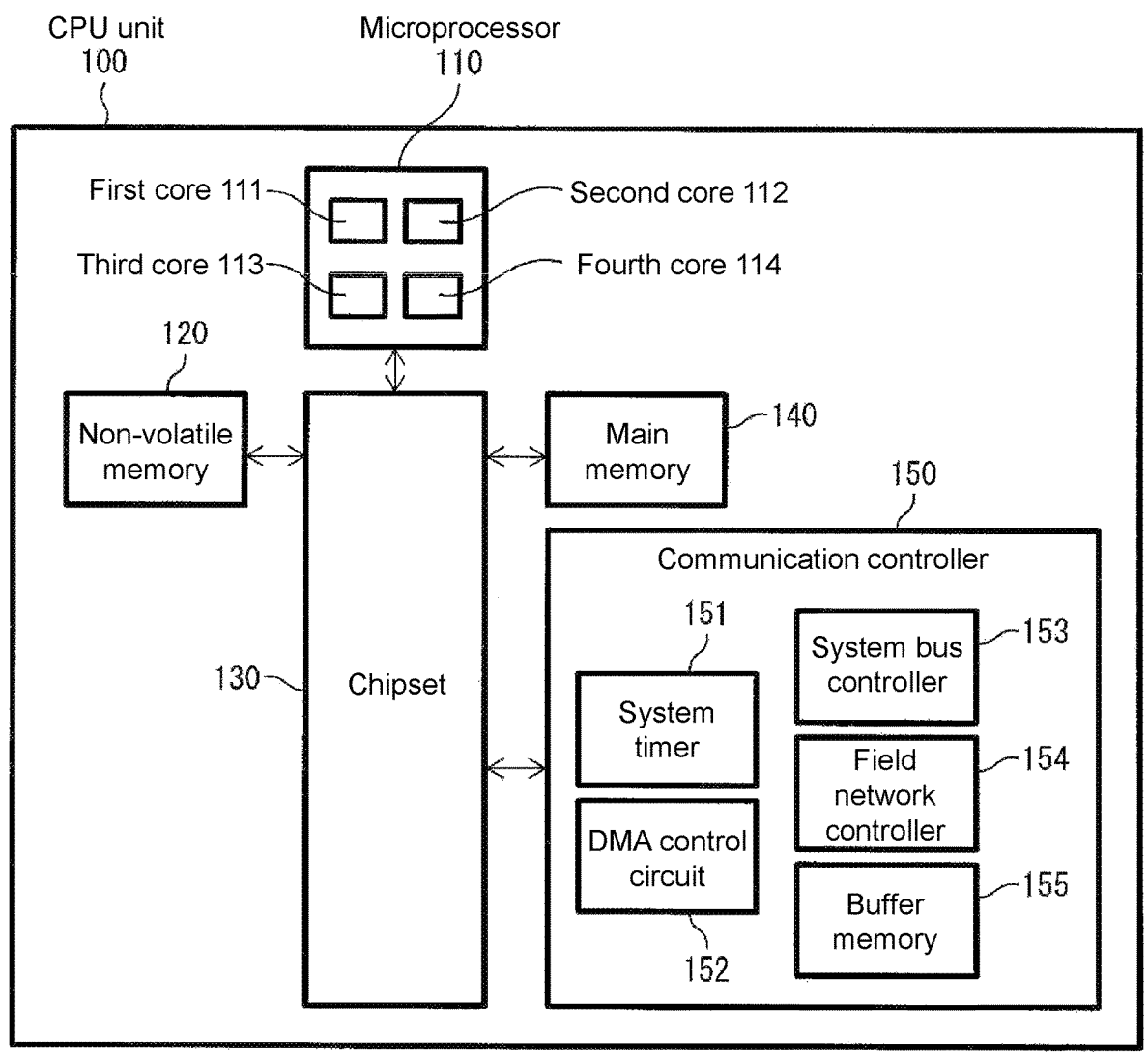
FIG. 1 is a diagram illustrating a hardware configuration of a CPU unit of a control device according to Embodiment 1 of the invention.

Hereinafter, Embodiment 1 of the invention will be described in detail based on FIGS. 1 to 4. The same or corresponding parts in the drawings are labeled with the same reference symbols and the description thereof will not be repeated. In order to facilitate the understanding to a programmable logic controller (PLC) 10 (control device) according to an aspect of the invention, the overview of a control system 1 including the PLC 10 will be firstly described with reference to FIG. 2.

(Overview of Control System of Embodiment 1)

Figure 2:
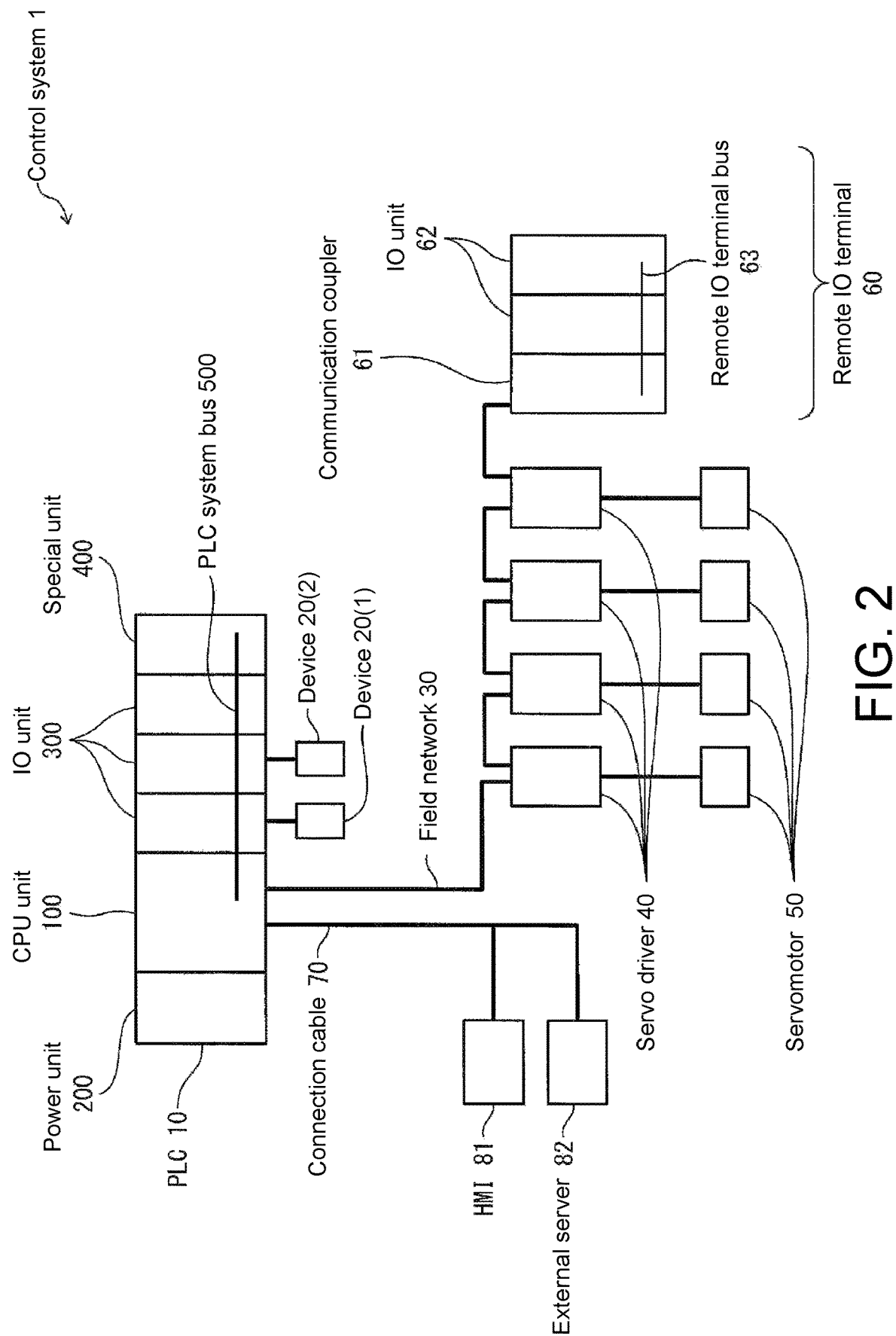
FIG. 2 is a diagram showing the overview of a control system including the control device according to Embodiment 1 of the invention.

FIG. 2 is a diagram showing the overview of the control system 1. The control system 1 includes the PLC 10, a servo driver 40 connected to the PLC 10 via a field network 30, a remote IO terminal 60, and a device 20 as a field instrument. Further, an HMI 81 and an external server 82 are connected to the PLC 10 via a connection cable 70, etc.

The PLC 10 is a control device controlling a control subject such as a machine and an apparatus, and mainly includes a CPU unit 100 that executes an arithmetic process, a power unit 200, one or more IO units 300, and a special unit 400. The CPU unit 100, each of the one or more IO units 300, and the special unit 400 are configured to be capable of exchanging data with each other via a PLC system bus 500.

The CPU unit 100 executes various processes relating to a state of the control subject, etc., such as executing a process of "controlling the control subject by repeatedly executing control programs which transmit output data, receive input data, and use input data to generate output data". Details of the CPU unit 100 will be described later with reference to FIG. 1.

The power unit 200 supplies power with an appropriate voltage to the CPU unit 100, the IO unit 300, and the special unit 400.

The IO unit 300 is a unit related to general input/output processes, and handles the input/output of binary data such as ON/OFF. That is, the IO unit 300 collects information such as information on either of a state where a device 20(1) as an input instrument such as a sensor is detecting a target object (ON) and a state where the device 20(1) is not detecting a target object (OFF). Also, the IO unit 300 outputs any of an activating command (ON) or a deactivating command (OFF) with respect to a device 20(2) as an output instrument such as a relay, an actuator. etc.

The special unit 400 has a function which the IO unit 300 does not support, such as input/output of analog data, temperature control, communication via a specific communication method.

The device 20 is an input/output instrument controlled by the PLC 10. The device 20(1) as an input instrument is, for example, a "detector" such as a temperature sensor, a light sensor, etc., a "switch (a push-button switch, a limit switch, a pressure switch, etc.)", etc. The device 20(2) as an output instrument is, for example, "actuator", "relay", "electromagnetic valve", "indicator device", "indicator lamp", etc. In the case where it is not necessary to distinguish between the device 20(1) and the device 20(2), the devices are generally represented as "the device 20".

The field network 30 transmits various data exchanged with the CPU unit 100. As the field network 30, typically, various industrial Ethernets® can be used. As the industrial Ethernet®, for example, EtherCAT®, Profinet IRT, MECHATROLINK®-III, Powerlink, SERCOS®-III, CIP Motion, etc. are known, and any of the industrial Ethernets may be adopted. Furthermore, field networks other than industrial Ethernets® may also be used. For example, in the case where motion control is not performed, DeviceNet, CompoNet/IP®, etc., may be used. In the control system 1, typically, a configuration in the case of adopting EtherCAT®, which is an industrial Ethernet®, as the field network 30 is exemplified.

Besides, by providing the CPU unit 100 with the function of the IO unit 300 and the function of the servo driver 40, the PLC 10 may also have the configuration that the CPU unit 100 directly controls the control subject without exerting through the IO unit 300 and the servo driver 40 within the range covered by such built-in functions.

The servo driver 40 is connected to the CPU unit 100 via the field network 30, and drives the servomotor 50 in accordance with a command value from the CPU unit 100. More specifically, the servo driver 40 receives a command values such as a position command value, a speed command value, a torque command value from the PLC 10 at a fixed time interval (period). Also, the servo driver 40 obtains actual measurement values relating to the operation of a servomotor 50, such as location, speed (typically calculated from the difference between the current position and the previous position), torque, from detectors (the device 20(1)), such as a position sensor (rotary encoder) connected to a shaft of the servomotor 50, and a torque sensor. Then, the servo driver 40 sets the command value from the CPU unit 100 as a target value, and performs feedback control by adopting the actual measurement value as a feedback value. That is, the servo driver 40 adjusts the current for driving the servomotor 50, so that the actual measurement value approaches the target value. The servo driver 40 may also be referred to as a servomotor amplifier.

Although FIG. 2 shows an example of a system combining the servomotor 50 and the servo driver 40, other configurations, such as a system combining a pulse motor and a pulse motor driver, can also be adopted.

The remote IO terminal 60 basically performs a process relating to the general input/output process in the same manner as the IO unit 300. More specifically, the remote IO terminal 60 includes a communication coupler 61 for performing a process relating to data transmission by using the field network 30, and one or more IO units 62. The communication coupler 61 and each of the one or more 10 units 62 are configured to be capable of exchanging data with each other via a remote IO terminal bus 63.

The HMI 81 is a means for a human and a machine to exchange information; specifically, the HMI 81 is a means by which a human operates a machine (providing an instruction to the machine) or a machine informs a human of the current state/result. With respect to the HMI 81, the means by which a human gives an instruction to a machine includes, for example, a switch, a button, a handle, a dial, a pedal, a remote control, a microphone, a keyboard, a mouse, etc. In addition, the means by which a machine transmits the information relating to the current state/result to a human includes, for example, a liquid crystal screen, a meter, a lamp, a speaker, etc.

The external server 82 is a server storing information received from the PLC 10 and transmitting the stored information to the PLC 10 in response to a transmission request from the PLC 10.

In addition, in the control system 1, it is not necessary that the PLC 10 is one PLC. A plurality of PLCs 10 may respectively be communicably connected to each other via the field network 30. Next, the hardware configuration of the CPU unit 100 will be described with reference to FIG. 1.

(Hardware configuration of CPU unit)

FIG. 1 is a diagram illustrating a hardware configuration of the CPU unit 100 according to an embodiment of the invention. As illustrated in FIG. 1, the CPU unit 100 includes a microprocessor 110, a non-volatile memory 120, a chipset 130, a main memory 140, a communication controller 150, a system bus control circuit 160, and a field network control circuit 170. The CPU unit 100 may further include a USB connector (not shown). The chipset 130 and other components are respectively coupled via various buses.

The microprocessor 110 and the chipset 130 are typically configured according to a general-purpose computer architecture. That is, the microprocessor 110 interprets and executes command codes sequentially supplied from the chipset 130 according to an internal clock. As illustrated in FIG. 1, the microprocessor 110 includes a first core 111, a second core 112, a third core 113, and a fourth core 114.

The chipset 130 exchanges internal data with various components connected to the chipset 130, and generates command codes necessary for the microprocessor 110. Further, the chipset 130 has a function of caching data obtained as a result of execution of an arithmetic process by the microprocessor 110.

The CPU unit 100 includes a main memory 140 and a non-volatile memory 120 as storage means. The main memory 140 is a volatile storage area (RAM), and holds various programs to be executed by the microprocessor 110 after power is supplied to the CPU unit 100. In addition, the main memory 140 is also used as a working memory when the microprocessor 110 executes various programs. As such a main memory 140, for example, a dynamic random access memory (DRAM), a static random access memory (SRAM), etc., can be used.

On the other hand, the non-volatile memory 120 holds data such as system programs, like IO control, user programs, motion arithmetic programs, various applications, and system setting parameters in a non-volatile manner. The programs and data are copied to the main memory 140 so that the microprocessor 110 can access the programs and data as needed. As such a non-volatile memory 120, a semiconductor memory such as a flash memory can be used. Alternatively, a magnetic recording medium such as a hard disk drive, an optical recording medium such as a digital versatile disk random access memory (DVD-RAM), etc., can be used.

The communication controller 150 executes transmission of output data and reception of input data, is typically configured by using hardware such as FPGA, ASIC, etc., and is configured to be capable of transmitting/receiving data to/from the main memory 140 via the chipset 130. The communication controller 150 includes a system timer 151, a DMA control circuit 152, a system bus controller 153, a field network controller 154, and a buffer memory 155.

In the following description, data output from the CPU unit 100 to a unit other than the CPU unit 100 as well as data output from the PLC 10 to a device other than the PLC 10 are also referred to as "output data". In addition, data input to the CPU unit 100 from a unit other than the CPU unit 100 and data input to the PLC 10 from a device other than the PLC 10 are also referred to as "input data".

The system timer 151 generates an interrupt signal every fixed time interval (period) and provides the interrupt signal to the microprocessor 110. Typically, it is configured to generate the respective interrupt signals at a plurality of different time intervals according to the hardware specification, but it can also be set to generate the interrupt signals at an arbitrary time interval according to an operating system (OS), a basic input output system (BIOS), etc. By using the interrupt signal generated by using the system timer 151, the control operation of each execution period as will be described later is realized.

The DMA control circuit 152 transfers output data from the main memory 140 to the buffer memory 155, and transfers input data from the buffer memory 155 to the main memory 140.

The system bus controller 153 controls the exchange of data via the PLC system bus 500, and typically provides the functions of a physical layer and a data link layer in the PLC system bus 500. That is, the system bus controller 153 controls the transmission and reception between the CPU unit 100 and a unit other than the CPU unit 100 connected to the PLC system bus 500.

The system bus controller 153 performs a process of transmitting data (output data) stored in the buffer memory 155 to the IO unit 300 and the special unit 400 via the PLC system bus 500. In addition, the system bus controller 153 also performs a process of receiving data (input data) input from the IO unit 300 and the special unit 400 via the PLC system bus 500 and storing the data in the buffer memory 155.

In the case where the CPU unit 100 itself is provided with the functions of the IO unit 300 and the servo driver 40, the parts handling the functions serve as the communication counterparts, and the transmission of output data and the reception of input data by the system bus controller 153 are transmission and reception performed inside the CPU unit 100.

The field network controller 154 controls the exchange of data via the field network 30, and typically provides the functions of a physical layer and a data link layer in the field network 30. That is, the field network controller 154 controls the transmission of output data and the reception of input data in accordance with the standard of the field network 30 that is used. Specifically, the field network controller 154 performs a process of transmitting output data of the buffer memory 155 and a process of receiving input data and storing the input data in the buffer memory 155 to and from other devices connected to the field network controller 154.

Here, as described above, in this embodiment, since the field network 30 in accordance with the EtherCAT® standard is adopted, the field network controller 154 including hardware for performing normal Ethernet communication is used.

In the EtherCAT® standard, a common Ethernet® controller that realizes a communication protocol according to the normal Ethernet® standard can be used. However, depending on the types of the industrial Ethernet® adopted as the field network 30, a specially designed Ethernet® controller compatible with a communication protocol with a dedicated specification different from the normal communication protocol is used. In addition, in the case where a field network other than the industrial Ethernet® is adopted, a dedicated field network controller responsive to the standard is used.

The buffer memory 155 functions as a transmission buffer of data output to other devices, etc., via the field network 30 and data (output data) output to units other than the CPU unit 100 via the PLC system bus 500. In addition, the buffer memory 155 functions as a reception buffer of data input from other devices, etc., via the field network 30 and data (input data) input from units other than the CPU unit 100 via the PLC system bus 500.

The output data generated by the arithmetic process performed by the microprocessor 110 is primitively stored in the main memory 140. Then, the output data to be transferred to a specific device/unit is read from the main memory 140 and temporarily held in the buffer memory 155. Also, the input data transferred from another device/unit is transferred to the main memory 140 after being temporarily stored in the buffer memory 155. That is, the buffer memory 155 is a memory area used for data communication with the main memory 140.

As described above, the CPU unit 100 may also include a USB connector (communication port) as an interface for connection with the HMI 81 and the external server 82.

(Software Configuration of CPU Unit)

The PLC 10 controls a control subject such as a machine and an apparatus, etc., and stores, analyzes, displays, etc., information obtained from the control subject and information generated in the own device, etc. For example, the CPU unit 100 of the PLC 10 controls the control subject by repeatedly transmitting output data, receiving input data, and executing a control program that generates output data by using input data. Further, for example, the CPU unit 100 of the PLC 10 stores and analyzes the information acquired by the PLC 10 or generated in the own device, and displays the information on the HMI 81.

Here, the CPU unit 100 of the PLC 10 executes various programs by using an execution unit referred to as "task". The processes/programs that can be executed by the PLC 10 in the "task" can be divided into three types, which are "IO control", "control program", and "system service". "System service" can be construed as a process other than "IO control" and "control program" among the processes/programs which the PLC 10 executes. Therefore, "system service" is not a necessary component of "task".

The user can set a task as the execution unit of the programs by using a PLC support device (not shown). Specifically, the execution period and the execution timing of the task, the programs which the task executes (e.g., the control program), whether to execute IO control in the task, etc., can be set and defined. The user may be able to assign, for example, up to 128 programs per task by using the PLC support device. The setting of the task is transferred from the PLC support device to the CPU unit 100 via, for example, the connection cable 70 and stored in the non-volatile memory 120, etc. As mentioned above, since "system service" can be construed as one other than "IO control" and "control program" among the processes/programs executed by the PLC 10, "system service" which the user does not designate to execute in the task may also be executed in the task.

The user can set priorities among a plurality of tasks by using the PLC support device. For example, the user can use the PLC support device to set three types of tasks, which are primary periodic tasks, periodic tasks, and event tasks, having respectively different priorities. The primary periodic task adopts, for example, "IO control, user program, motion arithmetic program (and system service)" as main process contents (execution contents). The periodic task adopts, for example, "IO control, user program (and system service)" as main process contents. The event task adopts, for example, "user program (and system service)" as main process contents. The PLC 10 executes the primary periodic task with the highest priority, the user can also designate the priority relationship between the periodic task and the event task, and the priorities relating to the execution order may be further set among a plurality of periodic tasks.

For the PLC 10, it is not necessary to distinguish between the primary periodic task and the periodic task, and the primary periodic task and the periodic task may be generally classified as "tasks to be repeatedly executed at a fixed time interval (tasks to be performed periodically)" without distinguishing between the primary periodic task and the periodic task.

In the following, the outline of "IO control", "control program", and "system service" as the processes/programs executed by the PLC 10 in "task" will be described in this order.

(IO Control)

"IO control" is a process controlling the input/output of input data and output data. An IO control program is one of the system programs, and includes an output process program and an input process program.

"Output process program" rearranges output data generated by execution of a control program such as a user program into a format suitable for transferring to the communication controller 150. In the case where the system bus controller 153 or the field network controller 154 needs an instruction for executing transmission from the microprocessor 110, the output process program issues such an instruction.

"Input process program" rearranges input data received by at least one of the system bus controller 153 and the field network controller 154 into a format suitable for the control program (microprocessor 110) to use.

"System program" is a group of software for providing the PLC 10 with functions as the control device, and includes a scheduler program, an IO control program, a sequence command arithmetic program, a motion arithmetic program, and a system service program.

Among the system programs, the sequence command arithmetic program and the motion arithmetic program are also "control programs". As will be described in detail later, the user program as "control program" cooperates with the sequence command arithmetic program and the motion arithmetic program as "control programs" to realize the control purpose of the user. The user program can further cooperate with an application (particularly, a control application) to realize the control purpose of the user. That is, the user program realizes programmed operations by using commands, functions, function modules, etc., provided by the sequence command arithmetic program, the motion arithmetic program, and the application.

Among the system programs, the IO control program, the sequence command arithmetic program, the motion arithmetic program, and the system service program will be described later, and the outline of the scheduler program will be firstly described.

"Scheduler program" controls to start the execution and resume the execution after the execution is interrupt in each execution cycle (task period) with respect to the output process program, the input process program, and the control program. More specifically, the scheduler program controls execution of the user program, the sequence command arithmetic program, the motion arithmetic program, and the application.

For example, the CPU unit 100 adopts an execution cycle (control cycle) of a fixed time interval suitable for the motion arithmetic program as a common cycle (task period) of the entire process (entire task). Therefore, it is difficult to complete the execution of all programs within one control cycle (task period). Consequently, programs whose execution is to be completed in each control cycle and programs that may be executed over a plurality of control cycles are classified according to the priorities (priority order) of the programs to be executed. The scheduler program manages the execution order of the classified programs. More specifically, in each control cycle period, the scheduler program preferentially executes a program that is assigned a higher priority.

(Control Program)

"Control program" include "user program", "motion arithmetic program", "sequence command arithmetic program", and "application (in particular, control application)". Among "control programs", "motion calculation program" and "sequence instruction calculation program" are also system programs, as described above.

Strictly speaking, "user program" includes user programs other than user programs executed periodically (e.g., a high speed period such as a period of several ms) for high speed and high precision control with respect to the control subject. For example, there are also some user programs executed non-periodically, or executed in a low speed period (e.g., repeated at a time interval such as an interval of tens of ms). However, in the following description, the term "user program" means, unless otherwise stated, "a user program executed periodically (high speed period) for high speed and high precision control with respect to the control subject".

Also, "application" includes applications (control applications) executed periodically (e.g., a high speed period such as a period of several ms) for high speed and high precision control with respect to the control subject and applications other than the above. Details will be described later.

(User Program)

"User program" is generated responsive to a control subject (e.g., a line and processes of the target) of the user, that is, "user program" is a program arbitrarily designed responsive to the line (processes), etc., of the control subject controlled by using the control system 1. A PLC support device (not shown) generates a user program by compiling a ladder program (source program) described in ladder logic (ladder language), etc. The user program in the form of object program generated by using the PLC support device is transferred from the PLC support device to the CPU unit 100 via, for example, the connection cable 70 and stored in the non-volatile memory 120, etc. Ladder logic is a method for describing logic circuits and is a programming language adopted in many industrial control devices. The user program is typically generated in the form of object program that can be executed by using the microprocessor 110 of the CPU unit 100.

The user program for high speed and high precision control with respect to the control subject is repeatedly executed by the microprocessor 110 at a high speed period, such as a period of several ms. On the other hand, the user program not aiming at high speed and high precision control with respect to the control subject is executed by the microprocessor 110 periodically at a low speed period, such as a period of several tens of ms, or non-periodically (event-based).

(Motion Arithmetic Program and Sequence Command Arithmetic Program)

"Motion arithmetic program" is a program executed according to the instruction from a user program and calculating a command value output with respect to a motor driver such as the servo driver 40 and a pulse motor driver, etc., each time when being executed. By executing "motion arithmetic program", the CPU unit 100, for example, continuously controls (motion control) the operation displacement and the operation speed of the device 20(2) as an actuator, etc.

"Sequence command arithmetic program" is a program called when a predetermined sequence command used in a user program is executed, and is executed to realize the content of the command. By executing "sequence command arithmetic program", the CPU unit 100 controls (sequence control), for example, ON/OFF of the device 20(2) as an actuator, etc.

(Application)

"Application" is, for example, a program for database connection, OPC unified architecture (OPC-UA), artificial intelligence/machine learning (AI), computerized numerical control (CNC), robot control, etc. The application includes control applications (hereinafter referred to as "control applications") for high speed and high precision control with respect to the control subject and applications (hereinafter referred to as "non-control applications") other than the control application.

"Control application", among the applications, is an application for high speed and high precision control with respect to the control subject, and is an application repeatedly executed at the same time interval as the user program for high speed and high precision control with respect to the control subject. The control application is, for example, an application for computerized numerical control (CNC), robot control, etc. User programs can call the control applications and use the control applications to realize high speed and high precision control with respect to the control subject. "Control application" and "user program for high speed and high precision control with respect to the control subject" are repeatedly executed, for example, in an execution interval less than or equal to a prescribed time interval (e.g., several ms). Depending on the use, artificial intelligence/machine learning (AI) is an application executed as a control application or a non-control application.

"Non-control application" is an application built in the PLC 10 and aiming at a purpose other than high speed and high precision control with respect to the control subject, and is a program not required to be repeatedly executed at the execution interval less than or equal to a prescribed time interval (e.g., several ms) with respect to the control subject. In other words, "non-control application" is a program irrelevant of high speed control computation, and, for example, suitable for describing "a communication process and a backup process". Specifically, "non-control application" is a program for database connection, OPC unified architecture (OPC-UA), etc., and is also referred to as "information application". "Non-control application", among the applications, is (1) an application executed non-periodically, or (2) an application repeatedly executed at a time interval equal to or more than the prescribed time interval (the execution period at which the user program executed periodically).

By executing "non-control application, the PLC 10, for example, receives the following information from the device 20 by IO-Link, etc., and displays the received information on the HMI 81 or transmits the received information to the external server 82. That is, the PLC 10 receives information such as "product type", "serial No./lost No.", "connection position", "comment", "power voltage value", "turn-on time", "number of operations", "replacement date", "ON/OFF threshold", etc., of the device 20 from the device 20, and displays the received information on the HMI interface 81 or transmits the received information to the external server 82.

(Notes on Schedule Management)

The scheduler program may also make the execution schedule of "non-control applications" independent of the execution schedule of "programs aiming at high speed and high precision control with respect to the control subject" and manage the two separately. "Programs for high speed, high precision control with respect to control subject" are, for example, "user programs, motion arithmetic programs, sequence command arithmetic programs, and control applications" executed by the microprocessor 110 at a high speed period. In other words, the PLC 10 may also separately include a scheduler for "non-control applications (e.g., information applications)" and a scheduler for "programs aiming at high speed and high precision control with respect to the control subject".

(System Service)

"System service programs" generally refer to a group of programs for realizing various functions of the PLC 10 other than "IO control" and "control program" among the processes/programs executed by the PLC 10. The system service program is, for example, a program that makes the microprocessor 110 execute communication with a machine, a process of a request from an external instrument, a self-diagnosis process. The system service program also includes a process of transferring the data of the main memory 140 to an external storage medium, a process of reading data from an external storage medium. Furthermore, the system service program also includes a program relating to a communication process between the CPU unit 100 and the PLC support device (not shown) via the connection cable 70 (USB), etc.

The control program and the scheduler program described above are stored in the main memory 140 and the non-volatile memory 120 serving as storage means. The microprocessor 110 of the CPU unit 100 reads out and executes the system program and the control program stored in the storage means at a suitable timing.

Next, how the various programs/processes having been described so far are set as tasks will be described with reference to FIG. 3(A) to FIG. 3(E). For example, with the user setting sequence control and motion control to one task in the PLC support device, the microprocessor 110 repeatedly executes the sequence control and the motion control at the same time interval.

(Regarding the relationship between task and the program)

FIG. 3(A) to FIG. 3(E) are diagrams showing examples of tasks to be executed by the PLC 10. As mentioned above, the user, for example, can use the PLC support device (not shown) to set the execution period and the execution timing of a task, whether IO control is present in the task (whether to execute IO control in the task), priorities, etc. In addition, a task including "IO control, user program, and motion arithmetic program", as a primary periodic task, is executed by the PLC preferentially over a periodic task and an event task which do not include "motion arithmetic program".

FIG. 3(A) is an example of "periodic task", which is a task executed periodically at 1 ms and includes the IO control and the user program but does not include the motion arithmetic program. The PLC 10 executing the periodic task illustrated in FIG. 3(A) executes, for example, the following process.

That is, with the microprocessor 110 repeatedly executing the input process program as the IO control at the prescribed time interval (scan time, which is 1 ms in the example illustrated in FIG. 3(A), the PLC 10 repeatedly receives signals from the device 20(1) as an input instrument at the prescribed time interval. The microprocessor 110 repeatedly executes the user program, such as a ladder program, etc., at the prescribed time interval by using signals repeatedly obtained from the device 20(1) at the prescribed time interval, and repeatedly determines the control content on the device 20(2) as an output instrument at the prescribed time interval. With the microprocessor 110 repeatedly executing the output process program as the IO control at the prescribed time interval, the PLC 10 repeatedly transmits the determined control content to the device 20(2) at the prescribed time interval to control the state of the device 20(2).

As described above, within the time excluding the time required to execute the IO control and the user program from the task period of 1 ms, the microprocessor 110 may also execute "system service". That is, the system service is executed during the free time of all tasks (primary periodic task, periodic task, and event task).

FIG. 3(B) is an example of "primary periodic task", which is a task executed periodically at 1 ms and includes the IO control, the user program, and the motion arithmetic program. In addition to the IO control, the user program, and the motion arithmetic program, the control application is assigned to the primary periodic task illustrated in FIG. 3(B). As mentioned above, the primary periodic task illustrated in FIG. 3(B) is executed preferentially over the periodic task illustrated in FIG. 3(A), and is a task that can control the control subject at a high speed and a high precision.

FIG. 3(C) is an example of a task (periodic task) executed periodically at 2 ms and including the IO control and the user program but not including the motion arithmetic program, like FIG. 3(A). The PLC 10 preferentially executes the primary periodic task over the periodic task and the event task, and executes each of a plurality of periodic tasks in accordance to the priority (priority order) set by the user with respect to each of the periodic tasks. For example, in the case where the periodic task illustrated in FIG. 3(A) is set to have a higher priority than the periodic task illustrated in FIG. 3(C), the microprocessor 110 executes the periodic task of FIG. 3(C) after executing the periodic task of FIG. 3(A). In addition, the execution period (task period) of the periodic task is set as an integer multiple of the execution period of the primary periodic task.

FIG. 3(D) is an example of a task (periodic task) executed periodically at 4 ms and includes the user program but does not include the IO control and the motion arithmetic program. As described above, in principle, each of a plurality of periodic tasks is executed in accordance with the priority (priority order) set by the user with respect to each of the periodic tasks, and a periodic task not including the IO control is principally executed after a periodic task including the IO control. That is, the priority of the periodic task illustrated in FIG. 3(D) is lower than the priority of the periodic task illustrated in FIG. 3(A) and the priority of the periodic task illustrated in of FIG. 3(C).

The tasks in FIG. 3(A) to FIG. 3(C) described above are set to have a high speed execution period (task period) such as 1 ms or 2 ms. By repeatedly executing the tasks of FIG. 3(A) to FIG. 3(C) at the high speed task period (high speed period), the microprocessor 110 executes high speed and high precision control with respect to the control subject.

Comparatively, among the tasks executed by the microprocessor 110, there are also tasks not aiming at "high speed and high precision control with respect to the control subject". Such tasks not aiming at "high speed and high precision control with respect to the control subject" are, for example, executed non-periodically or executed periodically at a low speed task period by the microprocessor 110.

Here, "low speed task period" refers to an execution period longer than the task periods (e.g., 1 ms or 2 ms in the examples illustrated in FIG. 3(A) to FIG. 3(C) of tasks (primary periodic task or periodic task) aiming at "high speed and high precision control with respect to the control subject". That is, a period (time interval) equal to or more than "prescribed time interval (time interval) such as a fixed period suitable for the motion arithmetic program" may be referred to as "low speed task period (low speed period)". In other words, a time interval (period) equal to or more than the prescribed time interval (specifically, the execution period required for "high speed and high precision control with respect to the control subject") may be referred to as "low speed period".

"Periodic task that is a task executed periodically, includes the user program but does not include the IP control and the motion arithmetic program" as illustrated in FIG. 3(D) may also be executed at a low speed period. That is, FIG. 3(D) illustrates an example in which the task period (execution period) is set at 4 ms with respect to "periodic task including the user program but not including the IO control and the motion arithmetic program". However, for "periodic task including the user program but not including the IO control and the motion arithmetic program", a period of several tens of ms or more, that is, a low speed period, for example, may also be set as the task period of such a task.

In addition to the tasks (primary periodic task and periodic task) to be executed periodically as illustrated in FIG. 3(A) to FIG. 3(D), the microprocessor 110 also executes a task (event task) to be executed non-periodically. In the following, an example of the event task will be described with reference to FIG. 3(E).

FIG. 3(E) is a task (event task) executed non-periodically and is a task to which only the user program is assigned. The event task is executed only when a predetermined execution condition, such as "the PLC 10 receives a user command, etc." and "a condition of a predetermined variable is matched", is satisfied.

As having described with reference to FIG. 3(A) to FIG. 3(E), the tasks which the microprocessor 110 of the PLC 10 executes can be roughly classified into the following four types. That is, the tasks can be classified into: (1) "primary periodic task" that is "a task to be executed periodically (in particular, at the high speed period) and has IO control and motion control"; (2) a periodic task that is "a task to be executed periodically (in particular, at the high speed period) and has IO control but no motion control; (3) a periodic task that is "a task to be executed periodically (high speed period or low speed period), but has no IO control and no motion control"; and (4) an event task that is "a task to be executed non-periodically and has no IO control and no motion control". The priority of the periodic task of (2) is higher than the priority of the periodic task of (3).

However, it is not required to classify the tasks which the PLC 10 executes into the four types. For example, the tasks may also be roughly classified into the following two types of tasks. That is, the tasks may also be roughly classified into two types, which are "tasks to be executed periodically (the primary periodic task and the periodic tasks illustrated in FIG. 3(A) to FIG. 3(D)" and "tasks to be executed in the case where a predetermined condition is satisfied (the event task illustrated in FIG. 3(E)". In addition, "task to be executed periodically" and "task to be executed in the case where a predetermined condition is satisfied" which the PLC 10 executes are both tasks associated with the control with respect to the control subject and may be referred to as control tasks.

Among the applications, "control application" is assigned together with the user program to a task executed at the high-speed task period like the primary periodic task illustrated in FIG. 3(B).

Comparatively, "non-control application" is executed by the PLC 10 without being assigned to a task. The PLC 10 assigns "non-control application" to the fourth core 114 (application core) and directly executes "non-control application" without assigning "non-control application" to a task. On the other hand, the PLC 10 assigns, for example, "IO control", "control program", and "system service" that are assigned to "task" to the first core 111, the second core 112, and the third core 113, and executes "system service" and "task".

In other words, in the microprocessor 110 of the PLC 10, an application engine as the execution subject of "non-control application" is assigned to the fourth core 114. In addition, a controller engine as the execution subject of "task (as described above, a task may include a control application)" is assigned to the first core 111, the second core 112, and the third core 113 that are CPU cores other than the fourth core 114. Hereinafter, the details will be described with reference to FIG. 4.

(Regarding Processes/Programs Assigned to Each Core of a Multi-Core Processor)

Figure 4:
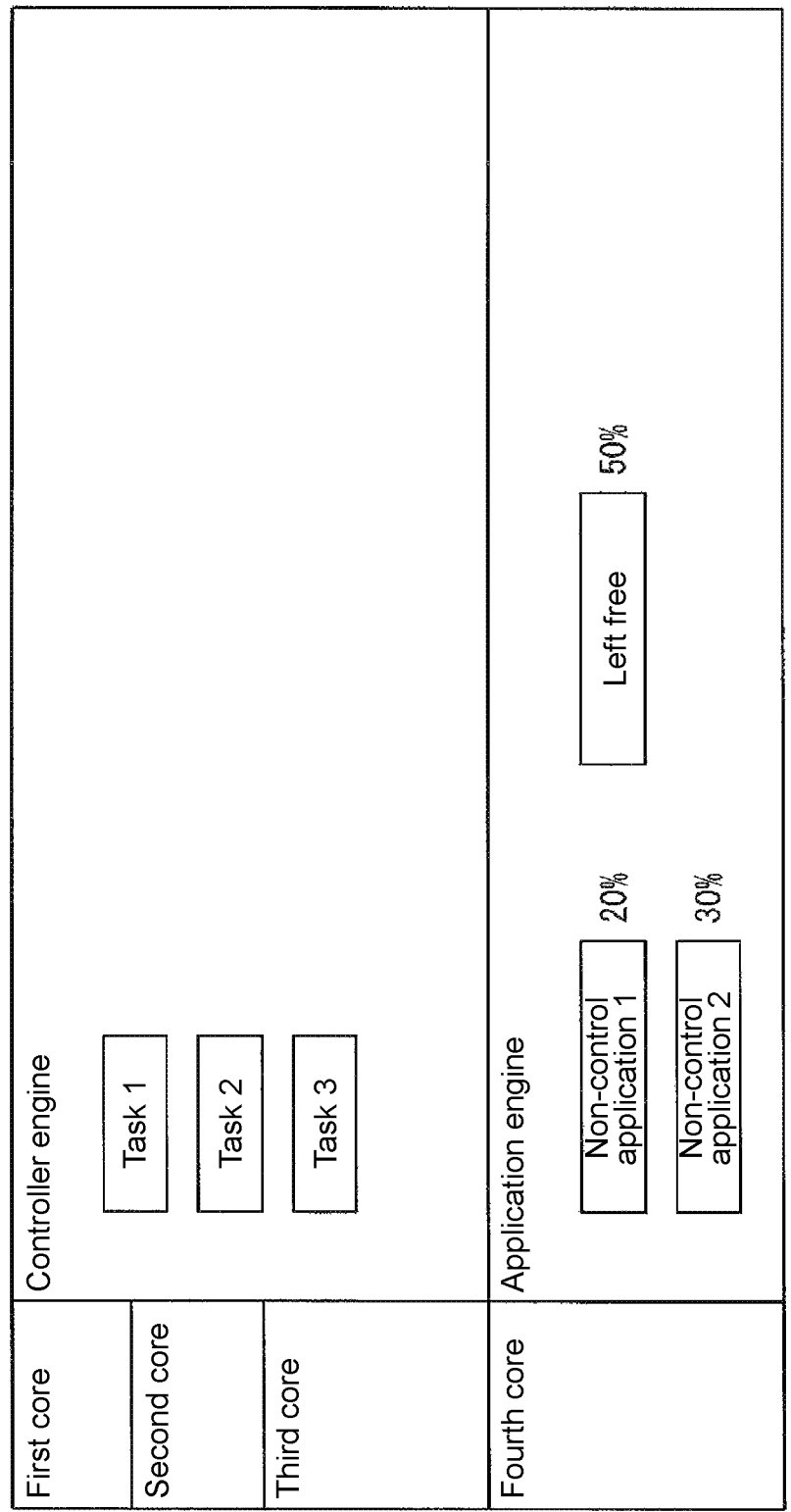
FIG. 4 is a diagram showing the overview of processes, etc., assigned to each of four cores in the CPU unit of FIG. 1.

FIG. 4 is a diagram showing the overview of the processes (programs), etc., assigned to each of the first core 111, the second core 112, the third core 113, and the fourth core 114 in the microprocessor 110 of the CPU unit 100. The overview of the programs assigned to each of the first core 111, the second core 112, the third core 113 and the fourth core 114 is firstly described in the following.

That is, the PLC 10 is a control device that controls the control subject by repeatedly executing a plurality of control programs at a prescribed time interval and includes the microprocessor 110 (multi-core processor) and the non-volatile memory 120 (memory) storing the control programs, and the microprocessor 110 includes the fourth core 114 (application core) to which only an application (i.e., a non-control application) that is an application and that is not required to be repeatedly executed with respect to the control subject at an execution interval less than or equal to the prescribed time interval.

According to the configuration, only the application not required to be repeatedly executed with respect to the control subject at the execution interval less than or equal to the prescribed time interval (application not aiming at high speed and high precision control with respect to the control subject), among the applications, is assigned to the fourth core 114. That is, in the microprocessor 110 of the PLC 10, the fourth core 114 to which "the application that is an application and that is not required to be repeatedly executed with respect to the control subject at the execution interval less than or equal to the prescribed time interval" is assigned and the core (specifically, the first core 111, the second core 112, and the third core 113) to which "the programs for high speed and high precision control with respect to the control subject (e.g., the tasks to which the programs required to be repeatedly executed with respect to the control subject at the execution interval less than or equal to the prescribed time interval are assigned, as well as the system services) are assigned are different. The "prescribed time interval" is, for example, several ms.

Here, for the control device such as a PLC, it is required to not only exert high speed and high precision control with respect to the control subject, but also to execute the process for using the information obtained/generated by the control device in an external device, the so-called process for informatization. In addition, there is a growing demand for installing various applications for such informatization on the control device.

However, there is a possibility that the conventional control device consumes resources due to execution of an application (e.g., the application for informatization) and influences execution of the "program for high speed and high precision control on the control subject".

The resources are computational resources for the control device such as a PLC to execute the program and the application and include CPU resources and memory resources. The CPU resources are, for example, the CPU bandwidth available for executing the program and the application.

To suppress the influence of the "application that is an application and that is not required to be repeatedly executed with respect to the control subject at the execution interval less than or equal to the prescribed time interval" on the "program for high speed and high precision control with respect to the control subject", the conventional control device takes the following measures. That is, the conventional control device suppresses the influence of the "application that is an application and that is not required to be repeatedly executed with respect to the control subject at the execution interval less than or equal to the prescribed time interval" on the program by ensuring a sufficient resource amount. For this reason, the conventional control device may increase the CPU cores and memories, which makes the device larger, or be divided into a plurality of control units which each execute only predetermined processes.

Comparatively, the PLC 10 can alleviate the interference of the "application that is an application and that is not required to be repeatedly executed with respect to the control subject at the execution interval less than or equal to the prescribed time interval" on the "program for high speed and high precision control with respect to the control subject" and efficiently execute both of them in the microprocessor 110. That is, the PLC 10 can execute the program and the non-control application not by increasing the resource amount but by efficiently using the resources. The PLC 10 requires neither to increase the size of the device to ensure a sufficient resource amount nor to be divided into the control units which each execute only the predetermined processes, and can be miniaturized.

In addition, the PLC 10 can alleviate the interference of the non-control application on the program and execute both efficiently. That is, the PLC 10 can rapidly execute the program required for controlling the control subject independent of the non-control application while suitably executing the non-control application, so the PLC 10 can realize high performance.

Therefore, with respect to a control device capable of executing the high speed and periodical process and the "application that is not required to be repeatedly executed with respect to the control subject at the execution interval less than or equal to the prescribed time interval among the applications" of the process for informatization, etc., the PLC 10 achieves the effect of being capable of rendering miniaturization as well as high performance.

In addition, the PLC 10 achieves the effect of being capable of executing the "application that is not required to be repeatedly executed with respect to the control subject at the execution interval less than or equal to the prescribed time interval among the applications" at any timing in accordance with the usage scene, that is, not subject to the limitation of the execution order defined according to the priorities.

Moreover, the PLC achieves the effect of making the development/upgrade of each of the "program for high speed and high precision control with respect to the control subject" and the "application that is not required to be repeatedly executed with respect to the control subject at the execution interval less than or equal to the prescribed time interval among the applications" possible without the concern of influencing others. Accordingly, various subjects can take part in the development/improvement of the "application that is not required to be repeatedly executed with respect to the control subject at the execution interval less than or equal to the prescribed time interval among the applications".

The PLC 10 may also manage the "non-control application" assigned to the fourth core 114 only and the "programs for high speed and high precision control with respect to the control subject (that is, the programs assigned to the first core 111, the second core 112, and the third core 113)" by using different schedulers. In other words, the PLC 10 may also separate the scheduler managing the execution of "non-control application" and the scheduler managing the execution of "task".

In the following, how the processes/programs to each of the first core 111, the second core 112, the third core 113, and the fourth core 114 in the microprocessor 110 of the PLC 10 are assigned is described in detail with reference to FIG. 4.

Tasks, namely "control program", "IO control", and "system service" executed in the tasks, are assigned to the first core 111, the second core 112, and the third core 113. Here, as described above, the control program includes the user program, the motion arithmetic program, the sequence command arithmetic program, and the control application.

Programs relating to "system service", such as a program relating to a communication process via the connection cable 70 (that is, a communication process via a communication port), are assigned to a predetermined proportion of the total resources of the first core 111.

Processes/programs other than "system service" that are executed in the tasks, namely "control program" and "IO control" are assigned to the second core 112 and the third core 113. As described above, among "applications", "control applications" are assigned to tasks, that is, "control applications" are assigned to the second core 112 and the third core 113.

That is, in the microprocessor 110 of the PLC 10, the control applications (applications that are applications and that are repeatedly executed with respect to the control subject at the execution interval less than or equal to the prescribed time interval) are assigned to the second core 112 and the third core 113 (control cores) as cores to which programs repeatedly executed with respect to the control subject at the execution interval less than or equal to the prescribed time interval are assigned.

According to the configuration, in the microprocessor 110, the control applications are, for example, assigned to the second core 112 and the third core 113 as cores to which the programs, such as the user program, repeatedly executed with respect to the control subject at the execution interval less than or equal to the prescribed time interval are assigned.

Therefore, the PLC 10 achieves the effect of being capable of efficiently executing the programs repeatedly executed with respect to the control subject at the execution interval less than or equal to the prescribed time interval in linkage in the second core 112 and the third core 113.

That is, in the microprocessor 110 of the PLC 10, a controller engine as the execution subject of "task" is assigned to the second core 112 and the third core 113. The controller engine efficiently links and executes a "control application" assigned to a certain task and a control program such as a user program assigned to the task.

In the example illustrated in FIG. 4, "system service" executed in "task" is assigned to the first core 111, processes/programs other than "system service" executed in "task" are assigned to the second core 112 and the third core 113. In other words, FIG. 4 illustrates an example where the core to which "system service" executed in "task" is assigned and the core to which "control program" and "IO control" are assigned are separate.

However, in the PLC 10, it is not required to separate the core to which "system service" is assigned and the core to which "control program" and "IO control" are assigned. For example, "system service", "control program", and "IO control" executed in "task" may also be assigned to "the first core 111, the second core 112, and the third core 113". "The first core 111, the second core 112 and the third core 113" to which "task", in other words, "IO control", "control program" and "system service" executed in "task", is assigned may also be referred to as control cores.

The fourth core 114 is only assigned "non-control application (e.g., information application)" among the "applications".

Here, in the fourth core 114 of the PLC, the proportion of the resources assigned to each of a plurality of non-control applications can be set by the user.

According to the configuration, in the fourth core 114, the proportion of the resources assigned to each of the non-control applications can be set by the user. In other words, the PLC 10 allows the user to set the usage proportion (e.g., the proportion of execution time, the proportion of memory usage, etc.) of the fourth core 114 for each of the non-control applications. In the example shown in FIG. 4, 20% of the total CPU resources of the fourth core 114 is assigned to "non-control application 1", and 30% of the total CPU resources of the fourth core 114 is assigned to "non-control application 2". In addition, the user may leave a predetermined proportion (50% in the example shown in FIG. 4) of the total resources of the fourth core 114 free for a non-control application to be installed to the PLC 10 in the future.

Therefore, the PLC 10 achieves the effect of being capable of suppressing the decrease in the processing speed of each of a plurality of non-control applications even if the user makes the PLC 10 install and execute a new application.

The application assigned to the fourth core 114 may also include an application for executing at least one of: (1) a process relating to connection with a database; (2) a process relating to connection with an external display device such as the HMI 81; and (3) a process of storing information obtained from the control subject and transmitting the stored information to an external server such as the external server 82.

According to the configuration, the application assigned to the fourth core 114 includes an application for executing at least one of: (1) a process relating to connection with a database; (2) a process relating to connection with an external display device; and (3) a process of storing information obtained from the control subject and transmitting the stored information to an external server.

Here, currently, with respect to the control device controlling a control subject by repeatedly executing a plurality of control programs at a prescribed time interval, such as a PLC, there is a growing demand for installing information applications (applications for informatization) for executing: (1) a process relating to connection with a database; (2) a process relating to connection with an external display device; and (3) a process of storing information obtained from the control subject and transmitting the stored information to an external server, etc.

Therefore, with respect to a control device capable of executing (1) a process relating to connection with a database; (2) a process relating to connection with an external display device; and (3) a process of storing information obtained from the control subject and transmitting the stored information to an external server, etc., in addition to high speed and periodical processes, the PLC 10 achieves an effect of being capable of rendering miniaturization as well as high performance.

So far, an example in which the PLC 10 includes the microprocessor 110 having four CPU cores, i.e., the first core 111, the second core 112, the third core 113, and the fourth core 114, is described. However, it is not required that the microprocessor 110 of the PLC 10 includes four CPU cores, as long as the microprocessor 110 has two or more CPU cores. In the microprocessor 110 having two or more CPU cores, it suffices as long as the PLC assigns the following two types of programs to different CPU cores. That is, it suffices as long as the "application not aiming at high speed and high precision control with respect to the control subject among the applications (the application not required to be repeatedly executed with respect to the control subject at the execution interval less than or equal to the prescribed time interval)" and the "program for high speed and high precision control with respect to the control subject (the program required to be repeatedly executed with respect to the control subject at the execution interval less than or equal to the prescribed time interval)" are assigned to different CPU cores.

SUMMARY

To solve the above issue, a control device according to an aspect of the invention, which controls a control subject by repeatedly executing a plurality of control programs at a prescribed time interval, includes a multi-core processor and a memory storing the control programs. The multi-core processor includes an application core as a core to which only an application that is an application and that is not required to be repeatedly executed with respect to the control subject at an execution interval less than or equal to a prescribed time interval is assigned.

According to the configuration, only the application that is an application and that is not required to be repeatedly executed with respect to the control subject at the execution interval less than or equal to the prescribed time interval (the application not aiming at high speed and high precision control with respect to the control subject) is assigned to the application core. That is, in the multi-core processor of the control device, the core to which the "application that is an application and that is not required to be repeatedly executed with respect to the control subject at the execution interval less than or equal to the prescribed time interval" is assigned and the core to which the "program for high speed and high precision control with respect to the control subject (that is, the program required to be repeatedly executed with respect to the control subject at the execution interval less than or equal to the prescribed time interval)" is assigned are different.

Here, for the control device such as a PLC, it is required to not only exert high speed and high precision control with respect to the control subject, but also to execute the process for using the information obtained/generated by the control device in an external device, the so-called process for informatization. In addition, there is a growing demand for installing various applications for such informatization on the control device.

However, there is a possibility that the conventional control device consumes resources due to execution of the "application that is an application and that is not required to be repeatedly executed with respect to the control subject at the execution interval less than or equal to the prescribed time interval (e.g., the application for informatization)" and influences execution of the "program for high speed and high precision control on the control subject". The resources are computational resources for the control device such as a PLC to execute the program and the application and include CPU resources and memory resources. The CPU resources are, for example, the CPU bandwidth available for executing the program and the application.

To suppress the influence of the "application that is an application and that is not required to be repeatedly executed with respect to the control subject at the execution interval less than or equal to the prescribed time interval" on the "program for high speed and high precision control with respect to the control subject", the conventional control device takes the following measures. That is, the conventional control device suppresses the influence of the "application that is an application and that is not required to be repeatedly executed with respect to the control subject at the execution interval less than or equal to the prescribed time interval" on the program by ensuring a sufficient resource amount. For this reason, the conventional control device may increase the CPU cores and memories, which makes the device larger, or be divided into a plurality of control units which each execute only predetermined processes.

Comparatively, the control device according to an aspect of the invention can alleviate the interference of the "application that is an application and that is not required to be repeatedly executed with respect to the control subject at the execution interval less than or equal to the prescribed time interval" on the "program for high speed and high precision control with respect to the control subject" and efficiently execute both of them in the multi-core processor. That is, the control device according to an aspect of the invention can execute the program and the application not by increasing the resource amount but by efficiently using the resources. The control device according to an aspect of the invention requires neither to increase the size of the device to ensure a sufficient resource amount nor to be divided into the control units which each execute only the predetermined processes, and can be miniaturized.

In addition, the control device according to an aspect of the invention can alleviate the interference of the "application that is an application and that is not required to be repeatedly executed with respect to the control subject at the execution interval less than or equal to the prescribed time interval" on the program and execute both efficiently. That is, the control device according to an aspect of the invention can rapidly execute the program required for controlling the control subject independent of the application while suitably executing the application, so the control device can realize high performance.

Therefore, with respect to a control device able to execute the high speed and periodical process and the "application that is an application and that is not required to be repeatedly executed with respect to the control subject at the execution interval less than or equal to the prescribed time interval" of the process for informatization, etc., the control device according to an aspect of the invention achieves the effect of being capable of rendering miniaturization as well as high performance.

In addition, the control device according to an aspect of the invention achieves the effect of being capable of executing the "application that is an application and that is not required to be repeatedly executed with respect to the control subject at the execution interval less than or equal to the prescribed time interval" at any timing in accordance with the usage scene, that is, not subject to the limitation of the execution order defined according to priorities.

Moreover, the control device according to an aspect of the invention achieves the effect of making the development/upgrade of each of the "program for high speed and high precision control with respect to the control subject" and the "application that is an application and is not required to be repeatedly executed with respect to the control subject at the execution interval less than or equal to the prescribed time interval" possible without the concern of influencing others. Accordingly, various subjects can take part in the development/improvement of the "application that is an application and that is not required to be repeatedly executed with respect to the control subject at the execution interval less than or equal to the prescribed time interval".

In the multi-core processor of the control device according to an aspect of the invention, an application that is an application and that is repeatedly executed with respect to the control subject at the execution interval less than or equal to the prescribed time interval may be assigned to a control core as a core to which a program repeatedly executed with respect to the control subject at the execution interval less than or equal to the prescribed time interval is assigned.

According to the configuration, in the multi-core processor, the application that is repeatedly executed with respect to the control subject at the execution interval less than or equal to the prescribed time interval is assigned to the control core as a core to which a program repeatedly executed with respect to the control subject at the execution interval less than or equal to the prescribed time interval is assigned.

Therefore, the control device according to an aspect of the invention achieves the effect of being capable of efficiently linking and executing the application that is repeatedly executed with respect to the control subject at the execution interval less than or equal to the prescribed time interval and the program repeatedly executed with respect to the control subject at the execution interval less than or equal to the prescribed time interval in the control core.

In the application core, a proportion of resources assigned to each of a plurality of applications not required to be repeatedly executed with respect to the control subject at the execution interval less than or equal to the prescribed time interval may be settable by a user.

According to the configuration, in the application core, the proportion of resources assigned to each of a plurality of applications not required to be repeatedly executed with respect to the control subject at the execution interval less than or equal to the prescribed time interval is settable by a user. In other words, with respect to each of the applications not required to be repeatedly executed with respect to the control subject at the execution interval less than or equal to the prescribed time interval, the control apparatus allows the user to set the usage proportion of the application core (e.g., the proportion of execution time, the proportion of memory usage, etc.). The user may leave a predetermined proportion of the total resources of the application core free for a non-control application to be installed to the control device in the future.

Therefore, the control device according to an aspect of the invention achieves the effect of being capable of suppressing the decrease in the processing speed of each of the applications not required to be repeatedly executed with respect to the control subject at the execution interval less than or equal to the prescribed time interval even if the user installs and executes a new application to the control device.

With respect to the control device according to an aspect of the invention, the application assigned to the application core may include an application for executing at least one of: (1) a process relating to connection with a database; (2) a process relating to connection with an external display device; and (3) a process of storing information obtained from the control subject and transmitting the stored information to an external server.

According to the configuration, the application assigned to the application core includes an application for executing at least one of: (1) a process relating to connection with a database; (2) a process relating to connection with an external display device; and (3) a process of storing information obtained from the control subject and transmitting the stored information to an external server.

Here, currently, with respect to a control device controlling the control subject by repeatedly executing a plurality of control programs at a prescribed time interval, such as a PLC, there is a growing demand for installing information applications (applications for informatization) for executing: (1) a process relating to connection with a database; (2) a process relating to connection with an external display device; and (3) a process of storing information obtained from the control subject and transmitting the stored information to an external server, etc.

Therefore, with respect to a control device capable of executing (1) a process relating to connection with a database; (2) a process relating to connection with an external display device; and (3) a process of storing information obtained from the control subject and transmitting the stored information to an external server, etc., in addition to high speed and periodical processes, the control device according to an aspect of the invention achieves an effect of being capable of rendering miniaturization as well as high performance.

The invention is not limited to the above-described embodiments. Various modifications are possible within the scope of the claims. Embodiments obtained by appropriately combining the technical means disclosed in different embodiments are also included in the technical scope of the invention.

What is claimed is:

1. A control device, controlling a control subject by repeatedly executing a plurality of control programs at a prescribed time interval, the control device comprising:
    a multi-core processor comprising a first core that is assigned with the plurality of control applications which are repeatedly executed by the control device at an execution interval less than or equal to the prescribed time interval and a second core that is assigned with a plurality of non-control applications which are non-periodically executed by the control device or repeatedly executed by the control device at an execution interval greater than the prescribed time interval, wherein the plurality of control applications and the plurality of non-control applications are assigned to different cores; and
    a memory storing the plurality of control programs,
    wherein in the second core, a proportion of CPU bandwidth and memory usage of a total CPU resource assigned to each of the plurality of non-control applications is settable by a user.

2. The control device according to claim 1, wherein in the multi-core processor, the plurality of control applications which are repeatedly executed with respect to the control subject at the execution interval less than or equal to the prescribed time interval are assigned to the first core to which a program repeatedly executed with respect to the control subject at the execution interval less than or equal to the prescribed time interval is assigned.

3. The control device according to claim 2, the non-control applications assigned to the second core comprises:
    an application for executing at least one of: (1) a process relating to connection with a database; (2) a process relating to connection with an external display device; and
    (3) a process of storing information obtained from the control subject and transmitting the stored information to an external server.

4. The control device according to claim 1, the non-control applications assigned to the second core comprises:
    an application for executing at least one of: (1) a process relating to connection with a database; (2) a process relating to connection with an external display device; and (3) a process of storing information obtained from the control subject and transmitting the stored information to an external server.

* * * * *